May 25, 1965 N. A. BOLTON 3,184,969
LIQUID LEVEL INDICATION SYSTEM
Filed June 10, 1963 2 Sheets-Sheet 1

INVENTOR.
N. A. BOLTON
BY
HIS ATTORNEY

United States Patent Office 3,184,969
Patented May 25, 1965

3,184,969
LIQUID LEVEL INDICATION SYSTEM
Norman A. Bolton, Scottsville, N.Y., assignor to General Signal Corporation, Rochester, N.Y., a corporation of New York
Filed June 10, 1963, Ser. No. 286,596
10 Claims. (Cl. 73—290)

This invention relates to a liquid level indication system, and, more particularly, pertains to such a system employing ultrasonic energy pulses for detecting and continuously indicating accurately the level of liquid in a tank irrespective of the effect of atmospheric conditions upon the propagation rate of ultrasonic energy pulses.

It has been proposed heretofore to employ ultrasonic energy as a means of detecting the liquid level in a tank. One method proposed may be referred to as the ultrasonic echo method where an electroacoustic transducer is placed in the bottom of the tank for directing a beam of ultrasonic vibrations toward the liquid surface. Alternately, it has been suggested to float such transducer on the surface of the liquid and to direct the beam of ultrasonic vibrations toward the bottom of the tank. In either instance, however, many problems result including problems in installation, maintenance, reception of false signals due to the presence of bubbles, suspensions, etc., in the liquid.

Another method proposed for employing ultrasonic vibrations includes a strip of material partially immersed into the liquid for carrying surface ultrasonic wave trains which are reflected by one of a group of successive perforations in the strip according to liquid level. The drawbacks to this type of liquid level detection include the necessity to have the strip of material within the liquid as well as the requirement of spacing the perforations quite close in order to have a continuously accurate indication of liquid level.

The invention disclosed herein overcomes the above-mentioned drawbacks with a system that is effective to provide a continuous and accurate indication of liquid level irrespective of the effect of atmospheric conditions the propagation rate of ultrasonic energy pulses. It is proposed in this invention to employ ultrasonic transducers mounted above the surface of the liquid so as to direct a beam of energy pulses toward such surface, which surface acts to reflect the energy pulses toward a receiving transducer. The transit time of an energy pulse (elapsed time between transmission and reception of such energy pulse) is utilized to give an indication of liquid level.

Inasmuch as it is a well-recognized fact that atmospheric conditions affect the rate of sound energy propagation, it is further proposed in this invention to provide a calibration means including a fixed reflective surface positioned between the ultrasonic transducers and the surface of the liquid for obtaining a calibration pulse which insures that an accurate indication of liquid level be provided irrespective of the effect of existing atmospheric conditions upon the rate of propagated ultrasonic energy. The fixed reflective surface may take the form of a strip of material positioned between the transmitting and receiving transducers and spaced vertically therefrom, above the surface of the liquid. A proportion is maintained between respective transit times of ultrasonic energy pulses for the entire depth of the tank whether the tank be open to the atmosphere or hermetically sealed.

Thus, one object of this invention is to provide a system for detecting and continuously indicating accurately the level of liquid in a tank irrespective of the effect of existing atmospheric conditions upon the propagation rate of ultrasonic energy pulses.

Another object of this invention is to provide a system including transducing means mounted above the surface of a liquid in a tank for directing a beam of energy pulses toward the surface of the liquid and employing the reflected energy pulses for indicating the liquid level.

Another object of this invention is to provide a system wherein the surface level of liquid in a tank is measured by producing a vibrational energy pulse above the surface and comparing the transit time of a portion of the pulse which is reflected from the liquid surface with the transit time of another portion of the pulse which is reflected over a predetermined distance from a fixed reflective surface.

Other objects, purposes and characteristic features of the present invention will be in part obvious from the accompanying drawings, and in part pointed out as the description of the invention progresses.

In describing the invention in detail, reference will be made to accompanying drawings, in which like reference characters designate corresponding parts throughout the several views, and in which.

For the purpose of simplifying the illustration and facilitating in the explanation, the various parts and circuits constituting the embodiment of the invention have been shown diagrammatically and certain conventional illustrations have been left in block form, the drawings having been made more with the purpose of making it easy to understand the principles and mode of operation than with the idea of illustrating the specific construction and arrangement of parts that would be employed in practice. The symbols (+) and (—) are employed to indicate the positive and negative terminals, respectively, of suitable batteries, or other sources of direct current; and the circuits with which these symbols are used always have current flowing in the same direction.

Figure 1:
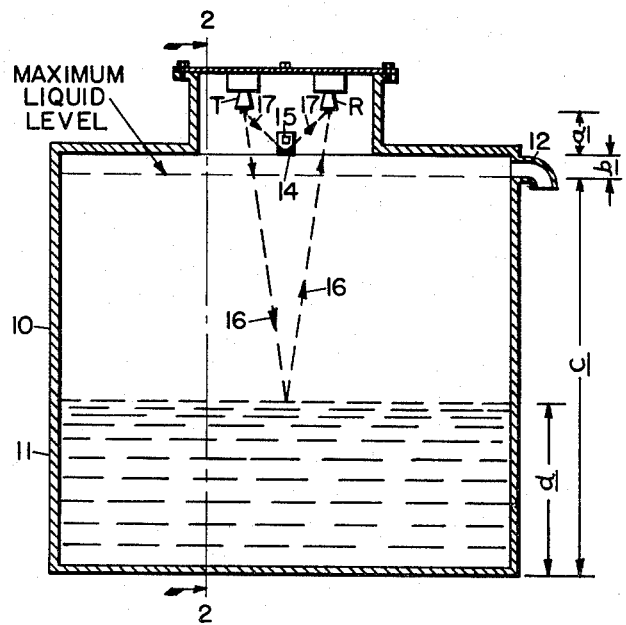
FIG. 1 illustrates the manner in which the transducers may be mounted within a tank and relative to reflective surfaces.

Referring now to FIG. 1, a tank 10 is shown having fluid 11 therein and at the level indicated. The maximum liquid level that the tank 10 is capable of holding is indicated by dashed lines as shown. To insure that the maximum liquid level is maintained, an overflow 12 is included. In the top portion of tank 10, a transmitting transducer T and a receiving transducer R are adjacently positioned. A strip of material 14 is attached to tank 10 by means of a bolt 15 so as to be positioned between the transducers T and R and spaced vertically therefrom and above the maximum liquid level a predetermined distance.

Figure 2:
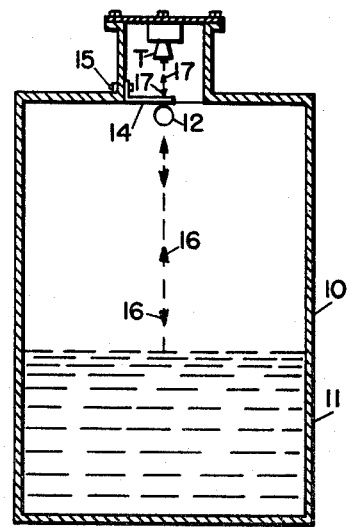
FIG. 2 is a side view of the tank further illustrating the positioning of the element employed as the fixed reflective surface.

The upper surface of strip 14 as well as the surface of fluid 11 serve to provide reflecting surfaces for ultrasonic energy pulses emanating from transmitting transducer T which, when reflected, are received by receiving transducer R. More particularly, an energy pulse emanated from transmitting transducer T takes the path of arrows 16 as it is directed downwardly towards the surface of fluid 11 and reflected therefrom to the receiving transducer R. A part of such energy pulse also takes the path of arrows 17 which part is reflected from the surface of strip 14 and is received by receiving transducer R. In FIG. 2, it is seen that the strip 14 at least is long enough to have a portion thereof positioned in vertical alignment with the propagated energy pulses as directed by transmitting transducer T.

With respect to the circuitry of this invention to be described hereinafter, it is suggested that a definite spacing relationship exist between the transducers T and R and the reflecting surface of strip 14 indicated as $a$ and between the strip 14 and the surface of the fluid 11 when at a maximum level indicated as $b$ relative to the total depth of the liquid indicated as $c$ and the existing depth of the liquid 11 indicated as $d$. For purposes of description herein, it is suggested that the distance relationships be: $a$ equal to one foot, $b$ equal to one-half foot, $c$ equal to nine and one-half feet and $d$ equal to four feet.

Figure 3:
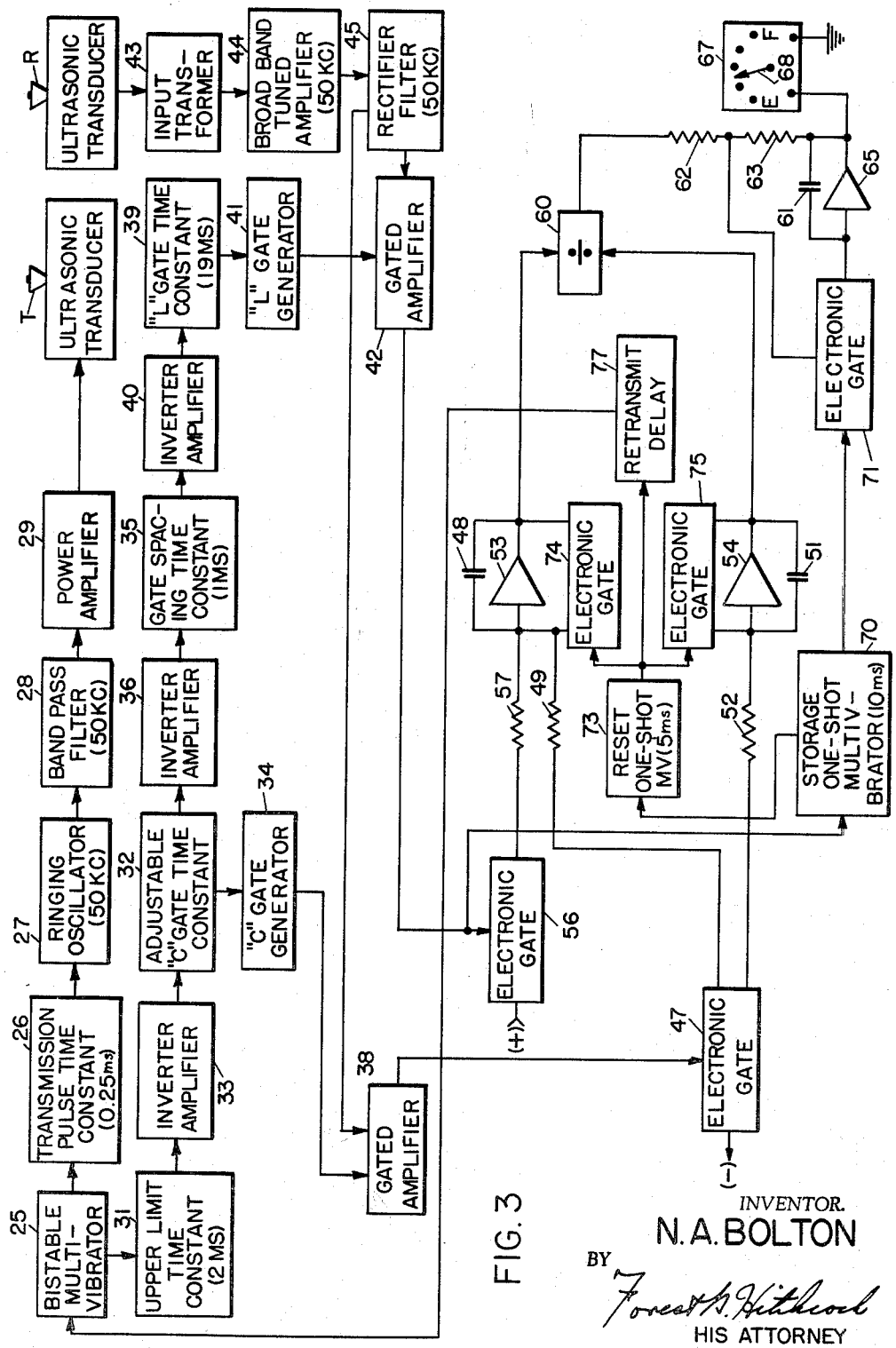
FIG. 3 is a block diagram of a preferred form of the invention hereof.

FIG. 3 illustrates by block diagram the circuitry required to cause generation of ultrasonic energy pulses, the gating circuitry for establishing suitable time gates relative to the distances mentioned above, and the circuitry for comparing and indicating the liquid level of tank 10. It is noted here that the circuitry for generating ultrasonic energy pulses and the gating circuitry, except for minor changes, is shown and described in the Patent No. 3,042,303 granted to H. C. Kendall et al. on July 3, 1962, of which I am co-inventor. A detailed description of such circuits employed herein may be had by referring to such Patent No. 3,042,303.

The energy pulse producing circuitry includes a bistable multivibrator 25 which functions to initiate the production of an ultrasonic energy pulse following the reception and usage of the last ultrasonic energy pulse transmitted as will be more particularly hereinafter described. Multivibrator 25 triggers a transmission pulse time constant 26 which controls an ultrasonic frequency ringing oscillator 27. The ringing oscillator 27 when so controlled applies an energy pulse through band pass filter 28 and power amplifier 29 to the transmitting ultrasonic transducer T. It is suggested here that the transmitted energy pulse have a duration in the order of 0.25 millisecond as determined by time constant 26 and at a frequency of fifty kilocycles as determined by oscillator 27, in view of the respective distances assumed herein. It is noted, however, that other values can be employed for other situations.

Bistable multivibrator 25 also applies its output signal to upper limit time constant 31 at the same time as it is applied to transmission pulse time constant 26. The duration of time constant 31 which is suggested to be in the order of two milliseconds is determined by the distance $a$ described above and the speed of sound energy. Time constant 31 controls the adjustable calibration gate constant 32 through an inverter amplifier 33.

Time constant 32 provides the calibration or "C" gate which is applied to a "C" gate generator 34 and to gate spacing time constant 35 through an inverter amplifier 36. The output of generator 34 is applied to a gated amplifier 38 for permitting amplifier 38 to function in response to received ultrasonic energy which is reflected from the fixed reflective surface.

The duration of time constant 35 is in the order of one millisecond and is relative to the distance $b$ described above. Time constant 35 controls the lever "L" gate time constant 39 through inverter amplifier 40. The duration of time constant 39 is in the order of nineteen milliseconds which is determined by the distance $c$ mentioned above and the speed of sound energy. The output of time constant 39 is applied to "L" gate generator 41 which controls the operation of gated amplifier 42 until a pulse of ultrasonic energy reflected from the surface of fluid 11 is received by receiving transducer R.

Each pulse of ultrasonic energy beamed from transmitter transducer T and reflected from the fixed reflective surface or the surface of the liquid 11 is reflected back to receiving transducer R where it is converted to a weak, fifty kilocycle electrical signal. This weak signal is first amplified by an input transformer 43 and then again amplified by a broad band tuned amplifier 44. The output of the amplifier 44 is passed through a rectifier filter 45 which feeds the gated amplifiers 38 and 42.

The outputs derived from amplifiers 38 and 42 which are in sequence according to the time gating as described and the sequential reception of ultrasonic energy pulses from the fixed reflective surface and the surface of fluid 11 are compared in the remainder of the circuit which operates to provide an output for indicating the depth of the fluid 11.

The output from gated amplifier 38 functions to close an electronic gate 47 for the duration of such output for permitting a $(-)$ reference voltage to be applied to capacitor 48 through resistor 49 and to capacitor 51 through resistor 52. The result is that each of the capacitors 48 and 51 is charged, during the interval that electronic gate 47 is closed, to a reference voltage level dependent upon the time constant value determined by the values of capacitance and resistance employed. Irrespective of such values employed, in order to cause the capacitors 48 and 51 to be charged to the same reference voltage level, the capacitance values of capacitors 48 and 51 must be alike. It is noted that the capacitors 48 and 51 form the feedback circuits respectively for operational amplifiers 53 and 54.

Gated amplifier 42 may be operated for a period of nineteen milliseconds as determined by the ouput from time constant 39. During this period of operation, however, gate amplifier 42 is momentarily controlled to an off condition by the output from tuned amplifier 44 representing the reflected energy pulse from the surface of the fluid 11 so as to open electronic gate 56. Prior to this time, the output fro mgated amplifier 42 is effective to cause electronic gate 56 to be closed during which time a $(+)$ reference voltage is applied to capacitor 48 through a resistor 57 which causes the discharge of capacitor 48 at a rate determined by the values of capacitor 48 and resistor 57. The opening of electronic gate 56, however, interrupts the discharge of capacitor 48.

The relative values of resistors 49 and 57 depend upon the distances $a$, $b$ and $c$. That is, the relationship of resistor 57 to resistor 49 in value should correspond to the relationship of the combined distances $b$ and $c$ to the distance $a$. In the present example, resistor 57 would be in the order of ten times the resistance of resistor 49. Thus, the only time that capacitor 48 would become fully discharged would be when the tank 10 is empty permitting electronic gate 56 to be closed for the entire nineteen milliseconds.

The positive $(+)$ side of each of the capacitors 48 and 51 is connected to an input of a division circuit 60. Division circuit 60 functions to divide the voltage level on capactor 48 by the voltage level on capacitor 51, the result of which is applied to a capacitor 61 through a resistor 62 and a resistor 63. Capacitor 61 being connected in the feedback circuit of operational amplifier 65 is charged dependent upon the level of output voltage from division circuit 60. The charge on capacitor 61 operates an indication meter 67 which may be a voltmeter calibrated to indicate the depth of liquid in tank 10. For the present example, the indicator 68 is shown to indicate that tank 10 is approximately four-tenths full of liquid, corresponding to distance $d$.

In order that capacitor 61 be discharged for each output of division circuit 60, a storage one-shot multivibrator 70 is controlled by the output of gated amplifier 42 at the same time electronic gate 56 is opened. During the controlled condition of multivibrator 70, which may be in the order of ten milliseconds, an output is supplied to electronic gate 71 for closing such gate for the period of appriximately ten milliseconds. The closure of gate 71 completes the discharge path for capacitor 61 which is then discharged through resistor 63.

At the end of the ten millisecond period, multivibrator 70 returns to its normal operating condition whereat an output signal is supplied to a reset one-shot multivibrator 73. Multivibrator 73 is operated for a period of time in the order of five milliseconds during which time electronic gates 74 and 75 are controlled from an open to a closed position. Electronic gate 74 in its closed position completes the discharge path for capacitor 48 which is completely discharged. Similarly, electronic gate 75 completes the discharge path for capacitor 51 which is also completely discharged.

The output from multivibrator 73 also controls retransmit delay circuit 77 which functions to provide a pulse delay for a sufficient period to permit the echoing of the ultrasonic energy pulse within tank 10 to sufficiently decay prior to transmitting another energy pulse. This delay interval may be in the order of the time required for ten energy pulses in succession to be transmitted the entire depth of tank 10 and reflected from the bottom surface thereof and received by transducer R, this time being in the order of 220 milliseconds. At the termination of the delay interval, delay 77 functions to operate bistable multivibrator 25 for again producing an energy pulse for transmission.

Having described a liquid level indication system as one specific embodiment of the present invention, it should be understood that this form has been selected to facilitate in the disclosure of the invention rather than to limit the number of forms which it may assume. It is to be further understood that various modifications, adaptations and alterations may be applied to the specific form shown to meet the requirements of practice, without in any manner departing from the spirit or scope of the present invention.

What I claim is:

1. A liquid level indication system for indicating continuously the level of liquid in a tank comprising, means for producing a succession of energy pulses, means for detecting parts of the energy pulses reflected from both the liquid surface spaced from the producing means and a fixed reflective surface positioned therebetween, signal producing means coupled to the pulse producing and pulse protecting means for producing a first signal in response to the elapsed time between producton of any energy pulse and the detection of a portion thereof reflected from said fixed reflective surface and a second signal in response to the elapsed time between the production of said energy pulse and the detection of a portion thereof reflected from the liquid surface, circuit means responsive to said signal producing means for providing an output signal corresponding to said first signal modified by said second signal, and liquid level indication means responsive to said circuit means for indicating the level of liquid in said tank.

2. The system according to claim 1 wherein the pulse producing means and the pulse detecting means include transducers positioned adjacently above the fixed reflective surface and the liquid surface and directed downwardly onto such surfaces.

3. The system according to claim 2 wherein the fixed reflective surface comprises a strip of material affixed to said tank so as to include a portion thereof between said transducers, said strip being from each of said transducers at predetermined distances.

4. A liquid level indication system for indicating continuously the level of liquid in a tank comprising, means for producing a succession of energy pulses, means for detecting parts of the energy pulses reflected from both the liquid surface spaced from the producing means and a fixed reflective surface positioned therebetween, signal producing means coupled to the pulse producing and pulse detecting means for producing a first signal in response to the elapsed time between the production of an energy pulse and the detection of a portion thereof reflected from said fixed reflective surface and a second signal in response to the elapsed time between the production of such energy pulse and the detection of a portion thereof reflected from the liquid surface, gating circuit means responsive to said first-mentioned means upon producing an energy pulse for establishing a first time gate and a second time gate in sequence, means responsive to said first signal during the interval of said first time gate and responsive to said second signal during the interval of said second time gate for producing an output signal characterizing both said first signal and said second signal, and a liquid level indicator responsive to the output signal produced by said last-mentioned means for indicating the level of liquid in said tank.

5. The system according to claim 4 wherein the time length of said first time gate is at least equal to the elapsed time between the production of an energy pulse and the detection of a portion thereof reflected from said fixed reflective surface and the time length of said second time gate is at least at long as the elapsed time between the production of an energy pulse and the detection of a portion thereof reflected from the bottom of said tank when empty.

6. The system according to claim 5 wherein said last-mentioned means includes a first storage means, a second storage means, said first signal when applied being stored by both said first storage means and said second storage means, said second signal being applied to only said second storage means to modify the stored signal thereof, and means for comparing by division the stored signal of said first storage means with the stored signal of said second storage means, whereby the output signal from the comparing means characterizes both said first signal and said second signal.

7. The system according to claim 5 and further including gate means responsive to said second signal effective to cause said output signal to be applied to said liquid level indicator.

8. The system according to claim 7 wherein said gate means includes a two-position means operative from a normal position to a second position for a limited time interval in response to said second signal, and reset means for resetting said first storage means and said second storage means in response to the operation of said two-position means to its normal position following said limited time interval.

9. The system according to claim 8 wherein said reset means is effective after a predetermined time delay to control the producing means for producing another energy pulse.

10. A liquid level indication system for continuously indicating the level of liquid in a tank comprising, means for emitting a succession of vibrational energy pulses through a gaseous medium above the liquid, means for detecting portions of the energy pulses reflected from the liquid-gas interface and a reflective surface positioned between said interface and said emitting means, first circuit means responsive to said detecting means for producing a first signal of amplitude corresponding to the time interval between emission of an energy pulse and detection of a portion of said pulse reflected from said reflective surface, second circuit means responsive to said detecting means for producing a second signal of amplitude corresponding to the time interval between emission of an energy pulse and detection of a portion of said pulse reflected from the liquid-gas interface, and signal combining means responsive to said first and second circuit means for providing an output signal of amplitude corresponding to the level of liquid in the tank.

References Cited by the Examiner
UNITED STATES PATENTS

| | | | |
|---|---|---|---|
| 2,753,542 | 7/56 | Rod et al. | 73—290 X |
| 2,943,296 | 6/60 | Fryklund | 73—290 X |
| 2,960,678 | 11/60 | Beard et al. | 340—1.6 |

ISAAC LISANN, *Primary Examiner.*